(12) United States Patent
Ekström et al.

(10) Patent No.: US 11,786,783 B2
(45) Date of Patent: Oct. 17, 2023

(54) IDENTIFYING A LOCATION FOR A STRIKER OF AN OBJECT

(71) Applicant: Topgolf International, Inc., Dallas, TX (US)

(72) Inventors: Per Dennis Ekström, Stockholm (SE); Johan Peter Cederloo, Stockholm (SE)

(73) Assignee: Topgolf International, Inc., Dallas, TX (US)

( * ) Notice: Subject to any disclaimer, the term of this patent is extended or adjusted under 35 U.S.C. 154(b) by 397 days.

(21) Appl. No.: 17/141,913

(22) Filed: Jan. 5, 2021

(65) Prior Publication Data

US 2021/0205659 A1 Jul. 8, 2021

Related U.S. Application Data

(60) Provisional application No. 62/957,766, filed on Jan. 6, 2020.

(51) Int. Cl.
*A63B 24/00* (2006.01)
*G10L 25/51* (2013.01)
(Continued)

(52) U.S. Cl.
CPC ...... *A63B 24/0021* (2013.01); *A63B 69/3694* (2013.01); *A63B 71/0622* (2013.01);
(Continued)

(58) Field of Classification Search
CPC ............ A63B 24/0021; A63B 69/3694; A63B 71/0622; A63B 2024/0031;
(Continued)

(56) References Cited

U.S. PATENT DOCUMENTS

| 9,217,753 B2 | 12/2015 | Molinari et al. |
| 9,245,457 B2 | 1/2016 | Kammerer et al. |

(Continued)

FOREIGN PATENT DOCUMENTS

| GB | 2567800 | 5/2019 |
| KR | 20170118061 A | * 10/2017 |
| KR | 1020170118061 A | 10/2017 |

OTHER PUBLICATIONS

International Application No. PCT/US2021/012202, Notification of Transmittal of the International Search Report and the Written Opinion of the International Searching Authority, dated Apr. 27, 2021, 10 pages.

(Continued)

*Primary Examiner* — Jeffrey S Vanderveen
(74) *Attorney, Agent, or Firm* — Fish & Richardson P.C.

(57) ABSTRACT

Methods, systems, and apparatus, including medium-encoded computer program products, for identifying the location of a striker of an object, includes, in at least one aspect, a method including receiving a request from a mobile computing device operated by a striker located in a striking area having space for two or more strikers to strike objects into a target area; initiating an audio recording by the microphone of the mobile computing device; identifying a physical location in the striking area and a first strike time determination for an object struck from the striking area based on sensor observations of the object in flight between the striking area and the target area; identifying a second strike time determination in the audio recording; and associating the physical location with the mobile computing device when the second strike time determination is matched with the first strike time determination.

20 Claims, 7 Drawing Sheets

(51) Int. Cl.
  *G06F 3/14* (2006.01)
  *G06F 3/16* (2006.01)
  *A63B 71/06* (2006.01)
  *A63B 69/36* (2006.01)
  *G10L 21/0232* (2013.01)
  *H04N 13/204* (2018.01)
  *G06T 7/292* (2017.01)

(52) U.S. Cl.
  CPC ............... *G06F 3/14* (2013.01); *G06F 3/165* (2013.01); *G10L 21/0232* (2013.01); *G10L 25/51* (2013.01); *A63B 2024/0031* (2013.01); *A63B 2024/0096* (2013.01); *A63B 2071/0638* (2013.01); *A63B 2071/0694* (2013.01); *A63B 2220/808* (2013.01); *A63B 2220/89* (2013.01); *A63B 2225/50* (2013.01); *G06T 7/292* (2017.01); *H04N 13/204* (2018.05)

(58) Field of Classification Search
  CPC .... A63B 2024/0096; A63B 2071/0638; A63B 2071/0694; A63B 2220/808; A63B 2220/89; A63B 2225/50; G06F 3/14; G06F 3/165; G06F 3/147; G10L 21/0232; G10L 25/51; G10L 21/0208; G06T 7/292; H04N 13/204; H04N 13/239; H04N 2013/0081; G09G 2340/12; G09G 2340/14

See application file for complete search history.

(56) References Cited

U.S. PATENT DOCUMENTS

| | | | |
|---|---|---|---|
| 9,602,858 | B1 | 3/2017 | Kaiser et al. |
| 9,607,525 | B2 | 3/2017 | Leech et al. |
| 9,807,283 | B1 | 10/2017 | Kaiser et al. |
| 10,080,947 | B2 | 9/2018 | Leech |
| 10,478,700 | B2 | 11/2019 | Leech |
| 2008/0021651 | A1 | 1/2008 | Seeley et al. |
| 2009/0295624 | A1 | 12/2009 | Tuxen |
| 2016/0074735 | A1 | 3/2016 | Dawe et al. |
| 2016/0306036 | A1 * | 10/2016 | Johnson ................. G06T 7/254 |
| 2017/0136336 | A1 | 5/2017 | Vollbrecht et al. |
| 2018/0318644 | A1 | 11/2018 | Forsgren |
| 2019/0329097 | A1 | 10/2019 | Hadden et al. |
| 2021/0133458 | A1 | 5/2021 | Tuxen et al. |

OTHER PUBLICATIONS

Extended European Search Report in European Appln No. 21738128.4, dated Apr. 21, 2023, 11 pages.

* cited by examiner

IDENTIFYING A LOCATION FOR A STRIKER OF AN OBJECT

CROSS-REFERENCE TO RELATED APPLICATIONS

This application claims the benefit of priority of U.S. Patent Application No. 62/957,766, entitled "IDENTIFYING A LOCATION FOR A STRIKER OF AN OBJECT", filed 6 Jan. 2020, which is incorporated herein by reference in its entirety.

BACKGROUND

This specification relates to identifying a position of a striker of an object, and tracking information corresponding to the striker and the object in motion.

A striker can be a golf player, the object can be a golf ball, and the area from which the golf ball is struck can be a tee area. The tee area is an area designated for players to hit golf balls and is typically part of a larger area called a driving range. A driving range is maintained as an environment for players to hit golf balls. The tee area can be partitioned into one or more "bays" and one or more players can occupy a bay.

In some cases, the tee area is not partitioned into bays, but is instead an open space, e.g., a grass field. Generally, players maintain a safe distance from other players also hitting golf balls, but unlike a tee area with designated bays, an open space tee area is not partitioned, and players are free to hit golf balls from any location not currently occupied by another player.

SUMMARY

This specification describes technologies relating to identifying a location of a striker that strikes an object, such as a golf ball, from a designated striking area monitored by a tracking system.

The described technologies include using data obtained from an audio recording recorded by a computing device operated by the striker to identify a striker's position. The tracking system identifies the location of a striker by comparing a strike time for an object struck from the striking area, as determined by the tracking system, with a strike time of an object determined using an audio recording received from the computing device. In this specification, a strike event is a strike of an object in the striking area observed by the tracking system, using one or more sensors. Information about the strike event includes the time in which the object was struck, i.e., its strike time, and a physical location from which the object was struck, within the striking area.

The tracking system can observe the object in motion after the object is struck, and can extrapolate a trajectory for the object backward (and potentially forward) in time. The tracking system can generate the trajectory using a physics model and observed motion characteristics for the object, e.g., an angle, pitch, or velocity for the object, as well as potentially using characteristics of a target area in which objects are struck, e.g., wind conditions of the target area. From the extrapolated trajectory, the tracking system can identify a strike location for the object in the striking area at the time it was struck, as well as the strike time for the object. The tracking system can observe two or more objects struck from the striking area and can extrapolate a trajectory for each object in real-time. In some implementations, the tracking system directly observes the initial location of the object before it is struck, and the time at which it is struck.

The tracking system can associate a physical location of the struck object in the striking area with the striker in possession of the computing device that sent the audio recording. As part of associating the physical location of the struck object with the computing device, the tracking system can determine whether the strike time of the object heard in the audio recording matches the strike time of an observed object, within a threshold of time.

The tracking system can distinguish from multiple heard shots by determining whether the strike location of one of the heard shots is from a location previously associated with a computing device.

The tracking system can initiate one or more audio recordings and identify one or more strike events of objects as occurring as a result of a striker striking the objects. From the identified strike event(s), the tracking system can associate the striker's position with an average location of the strike location(s) of the strike event(s).

Once the tracking system makes the association and identifies a striker's location, the system can send information regarding subsequent object strikes at the striker's location for rendering to a display of the computing device possessed by the striker.

In general, one or more aspects of the subject matter described in this specification can be embodied in methods that include the actions of receiving a request from a mobile computing device operated by a striker located in a striking area having space for two or more strikers to strike objects into a target area, wherein the mobile computing device includes a display and a microphone; initiating, in response to the request, an audio recording by the microphone of the mobile computing device; identifying a physical location in the striking area and a first strike time determination for an object struck from the striking area based on sensor observations of the object in flight between the striking area and the target area; identifying a second strike time determination in the audio recording; and associating the physical location, which has been identified based on the sensor observations, with the mobile computing device when the second strike time determination is matched with the first strike time determination.

Other embodiments of this aspect include corresponding systems, apparatus, and computer program products. These and other embodiments can optionally include one or more of the following features.

An embodiment can include sending information regarding one or more object strikes to the mobile computing device for rendering to the display of the mobile computing device when one or more identified locations of the one or more object strikes correspond to the physical location in the striking area.

The initiating, in response to the request, the audio recording by the microphone of the mobile computing device can include causing the computing device to display a prompt to record the audio recording, and the audio recording can be recorded during an interval of time.

The object can be a first object, the physical location can be a first physical location, the mobile computing device can be a first mobile computing device, and an embodiment can include: observing the first object and a second object in flight; identifying a second physical location in the striking area for the second object; and associating the first physical location can include determining that the second physical location is associated with a second mobile computing device.

The identifying the second strike time determination in the audio recording can include filtering out ambient noise from the audio recording.

The audio recording can be a first audio recording, the physical location can be a first physical location, the object can be a first object, and an embodiment can include: identifying a second physical location for a second object with a strike time determination that matches the second strike time determination; in response to identifying the second physical location, initiating one or more second audio recordings by the microphone of the mobile computing device until identifying a single strike time determination for an object that matches a strike time determination identified in a second audio recording of the one or more second audio recordings; identifying a third physical location in the striking area and a third strike time determination for the single object struck from the striking area based on sensor observations of the single object in flight between the striking area and the target area; and associating an average physical location computed from the first physical location and the third physical location with the mobile computing device, when the second strike time determination is matched with the first strike time determination, and the third strike time determination is matched with the strike time determination identified from the second audio recording.

The striking area can be a tee area for a golf range.

The object can be a golf ball, and sending the information regarding one or more further object strikes to the mobile computing device can include sending golf shot statistics, a golf shot animation in a virtual golf game, or a combination thereof.

The identifying the physical location in the striking area and the first strike time determination for the object can include: calculating an extrapolated trajectory for the object using observed motion characteristics for the object.

In general, one or more aspects of the subject matter described in this specification can be embodied in methods that include the actions of generating an audio recording using a microphone of a mobile computing device that includes the microphone and a display, wherein the mobile computing device is operated by a striker located in a striking area having space for two or more strikers to strike objects into a target area that is observed by one or more sensors of a tracking system; identifying a physical location in the striking area and a first strike time determination for an object struck from the striking area based on sensor observations of the object in flight between the striking area and the target area, wherein the sensor observations are obtained by one or more computers; identifying a second strike time determination in the audio recording; associating the physical location, which has been identified based on the sensor observations, with the mobile computing device when the second strike time determination is matched with the first strike time determination; and receiving from the one or more computers, information regarding one or more object strikes for rendering to the display of the mobile computing device, wherein the one or more object strikes originate from the physical location associated with the mobile computing device in the striking area.

Other embodiments of this aspect include corresponding systems, apparatus, and computer program products. These and other embodiments can optionally include one or more of the following features.

An embodiment can include sending a request to one or more computers of a tracking system; and in response to the request, obtaining the sensor observations from the one or more computers.

An embodiment can include displaying a prompt to record the audio recording; and generating the audio recording during an interval of time.

In general, one or more aspects of the subject matter described in this specification can be embodied in methods that include the actions of sending a request to one or more computers of a tracking system, wherein the mobile computing device is operated by a striker located in a striking area having space for two or more strikers to strike objects into a target area that is observed by one or more sensors of the tracking system; receiving, in response to the request, one or more instructions to initiate an audio recording by the microphone; generating the audio recording using the microphone; sending data of the audio recording to the one or more computers; and receiving from the one or more computers, information regarding one or more object strikes for rendering to the display of the mobile computing device, wherein the one or more object strikes originate from a physical location for the mobile computing device in the striking area.

Other embodiments of this aspect include corresponding systems, apparatus, and computer program products. These and other embodiments can optionally include one or more of the following features.

An embodiment can include displaying a prompt to record the audio recording, and generating the audio recording can include recording audio during an interval of time.

The data of the audio recording can be the audio recording in its entirety.

An embodiment can include identifying a first strike time determination in the audio recording; and sending the audio recording data can include sending the first strike time determination to the one or more computers.

The receiving the information regarding one or more further object strikes to the mobile computing device can include receiving golf shot statistics, a golf shot animation in a virtual golf game, or a combination thereof.

Other embodiments of this aspect include corresponding systems, apparatus, and computer program products. These and other embodiments can optionally include one or more of the following features.

An embodiment can include sending a request to one or more computers of a tracking system; and in response to the request, obtaining the sensor observations from the one or more computers.

An embodiment can include: identifying a first strike time determination in the audio recording; and wherein sending the audio recording data includes sending the first strike time determination to the one or more computers.

The audio recording can be a first audio recording, the physical location can be a first physical location, the object can be a first object, and an embodiment can include: identifying a second physical location for a second object with a strike time determination that matches the second strike time determination; in response to identifying the second physical location, initiating one or more second audio recordings by the microphone of the mobile computing device until identifying a single strike time determination for an object that matches a strike time determination identified in a second audio recording of the one or more second audio recordings; identifying a third physical location in the striking area and a third strike time determination for the single object struck from the striking area based on sensor observations of the single object in flight between the striking area and the target area; and associating an average physical location computed from the first physical location and the third physical location with the mobile computing device, when the second strike time determination is matched with the first strike time determination, and the third strike time determination is matched with the strike time determination identified from the second audio recording.

The striking area can be a tee area for a golf range.

The object can be a golf ball, and sending the information regarding one or more further object strikes to the mobile computing device can include sending golf shot statistics, a golf shot animation in a virtual golf game, or a combination thereof.

The receiving the information regarding one or more further object strikes to the mobile computing device can include receiving golf shot statistics, a golf shot animation in a virtual golf game, or a combination thereof.

Various embodiments of the subject matter described in this specification can be implemented to realize one or more of the following advantages. A location for a striker, e.g., a player on a grass tee range, can be accurately identified by a tracking system tracking objects struck from a striking area. The tracking system can provide information about a striker's performance in striking objects from the striking area, by associating observed objects in the striking area as having been struck by the striker, and providing the information to the striker through a computing device possessed by the striker. As a result, the striking area tracked by the tracking system does not have to be partitioned into designated locations associated with different strikers, but rather can be an un-partitioned open space with minimal sensor equipment.

The tracking system can be configured to separate ambient noise of an audio recording produced by a computing device operated by a striker, and to interact with the computing device to ensure that the tracking system accurately identifies the location of the striker within the striking area. Because the tracking system uses the recording of a striker-operated computing device, e.g., a smartphone, tablet computer or laptop, additional equipment does not have to be deployed in the striking area.

The tracking system may more accurately identify the location of the striker in the striking area by the techniques described in this specification as compared to conventional approaches, such as by using Global Positioning System (GPS) location, which is generally not accurate to a degree necessary to differentiate strikers in proximity to one another in the striking area. Further, GPS location is not always reliable because the striker might be in a location of the striking area obstructed by solid objects, e.g., buildings or trees. If high-precision GPS technology is used, strikers in the striking area may not have computing devices with the requisite technology. By contrast, the systems and techniques described in this application have a low hardware requirement for striker-operated computing devices, i.e., a display and microphone. Additionally, the tracking system can ascertain the location of a striker more accurately than other conventional approaches such as by prompting the striker to send their location to the tracking system, e.g., by estimating their location on a map of the striking area.

The tracking system can also be more reliable over conventional approaches requiring user decision-making for associating locations of strike events observed in a striking area with the corresponding striker. For example, rather than prompting the striker to strike two or more objects and then to identify locations on a map of the striking area indicating where objects were identified as being struck, the tracking system allows for automatically associating a physical location with the striker by simply prompting a single test shot and matching the timing for the sound of the test shot with the observation of the test shot.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
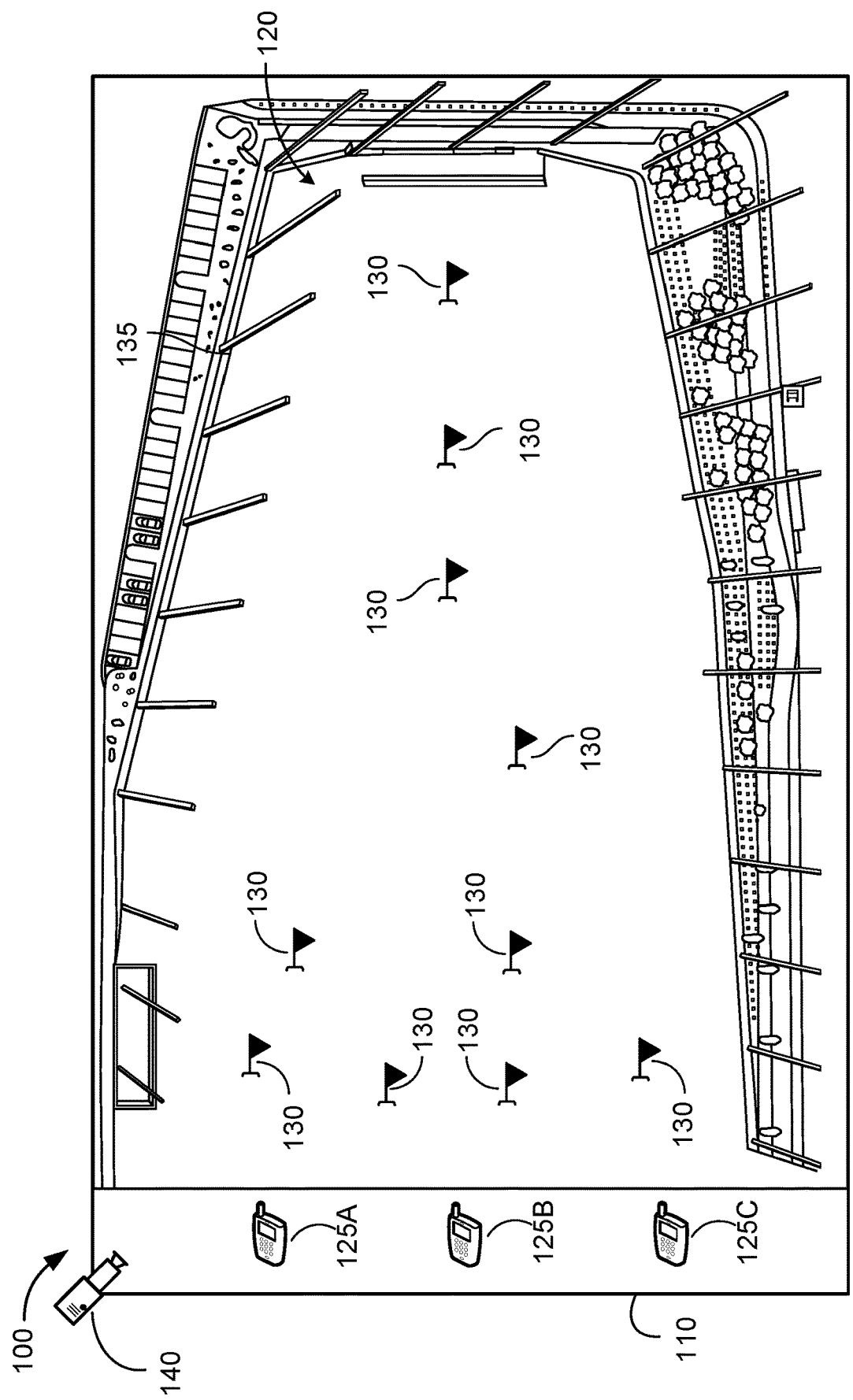
FIG. 1 shows an example of a tracking system that identifies positions of strikers striking objects from a striking area into a target area.

As shown in FIG. 1, a tracking system 100 identifies positions of strikers striking objects from a striking area 110 into a target area 120. The striking area 110 is a designated physical space in which strikers with computing devices, e.g., computing devices 125A-C, can strike objects into the target area 120.

A striker refers to a person who strikes an object from the striking area 110 into the target area 120. The striker can be one who strikes the object from the striking area 110 using an implement, e.g., a golf club or a baseball bat. Alternatively, the striker can be one who strikes the object from the striking area 110 using a portion of their own body, e.g., their foot.

As an example, the tracking system 100, the striking area 110, and the target area 120 can be part of a golf facility. The strikers can be golf players who hit golf balls from the striking area 110, e.g., a tee area, into the target area 120, e.g., a driving range.

The target area 120 can be of various shapes and sizes, e.g., 300-500 feet wide and 600-900 feet long. The target area 120 can include targets 130 and a netting 135 for enclosing the target area 120. But these components are not required. In some implementations, the target area 120 is any physical space, e.g., an open field, designated for objects struck by the strikers.

The striking area 110 is an open space for strikers to strike objects into the target area 120. The striking area 110 can be part of a golf facility, and/or the striking area 110 can be an open tee area, e.g., a grass tee area. Generally, the striking area 110 is free from markings or barriers indicating a partition of discrete locations, e.g., "golf bays," within the striking area 110. A striker can strike objects from any location within the striking area 110, and the location itself may be a free portion of the striking area 110 unoccupied by other strikers, e.g., between 1 and 5 meters away from other strikers. A location for a striker in the striking area 110 is measured by the space physically occupied by the striker and some amount of extra space, e.g., 2 square meters, for the striker to maneuver and strike objects unimpeded by obstacles or other strikers.

The striking area 110 is monitored by a sensor 140. In general, the sensor 140 is configured to receive sensory data about objects struck by strikers in the striking area 110. In some implementations, one or more additional sensors are also implemented and configured to receive sensory data about the struck objects from the striking area 110.

The one or more additional sensors can be of different types, e.g., optical or radar, but generally receive sensory data for ascertaining a strike location and strike time (collectively, the "strike event") of an object struck from the striking area 110. The sensor 140 can be a stereo camera unit, e.g., a single stereo camera or two or more cameras operated together to provide stereo vision of the objects in flight.

The additional sensor(s) can be used to create a stereo vision system when each sensor is a single camera. Alternatively or in addition, the additional sensor(s) can be used to cover a larger striking area.

In some implementations, two or more stereo camera sensors 140 are used to track objects in flight in three-dimensional space. In some implementations, at least one additional sensor is a sensor unit that integrates a radar device and a camera to track the objects in three dimensions, where the camera is used to provide angle information for the object in a two dimensional plane, and the radar device is used to provide (in combination with the camera) depth information for the object in a dimension perpendicular to the plane. For example, for each in-flight camera observation of the object, the radial distance to the object is used to calculate, a depth distance to the ball based on a camera angle for the in-flight camera observation (using a pinhole camera model, trigonometry, and a known separation distance between the camera and the radar device, which distance can be zero). Other sensor types and sensor data combinations are also possible.

The sensor 140 can be communicatively coupled to one or more computers, e.g., by a wired connection to computer(s) physically located at or near the striking area 110. Alternatively or in addition, the sensor 140 (and optionally, the one or more additional sensors) are communicatively coupled to the computer(s) wirelessly, over a local- or wide-area network. The connections can be simplex, duplex, or half-duplex connections.

Note that the sensor 140 can be part of a computer system, e.g., for a golf facility, that manages golf games and sends information about the golf shot, e.g., a simulated golf shot animation in a virtual golf game and/or a ball tracing overlay in an augmented reality golf shot viewer, to computing devices 125A-C in a tee area/striking area.

As described below in reference to FIG. 2, the tracking system 100 uses a data processing apparatus implemented using the sensor 140 and the optional one or more additional sensors to ascertain a strike location and strike time for an object struck from the striking area 110.

In some implementations, the tracking system 100 does not directly observe the object before it is struck from the striking area 110, but instead identifies an object's strike location and strike time based on an observation of the object in motion. After an object is struck, the tracking system 100 is configured to extrapolate a trajectory of the object backward (and potentially forward) in time.

When an object strike is detected, the tracking system 100 can determine a three dimensional trajectory for the object in the three dimensional physical space of the target area 120, based on the initial observations of the object observed in motion. Determining the trajectory can involve using a physics model for object flight applied to three dimensional coordinates in the three dimensional space, as determined from the initial observations of the object. Thus, at least the effects of gravity can be taken into consideration, and other physical parameters, such as wind speed and direction, and/or estimated ball spin. The objects struck from the striking area 110 can be assumed to be of uniform physical properties, e.g., a same shape, size, and weight.

In some implementations, the tracking system 100 directly observes an object in the striking area 110, at the moment in which the object is struck. When the object is struck and begins to move through the air, the tracking system 100 records the strike location and strike time for the object.

The tracking system 100 maintains an on-going clock, so that when the tracking system 100 identifies an object as having been struck, the tracking system 100 records the strike time for the object with a timestamp, using the clock and, in some implementations, an extrapolated trajectory of the object backwards in time. Additionally, the tracking system 100 can assign an identifier to a strike event for an observed object.

Each striker in the striking area 110 has a respective computing device, e.g., one of the computing devices 125A-C. A computing device can be any suitable mobile device, e.g., smartphone, tablet computer, or laptop computer, communicatively coupled with the tracking system 100 through client software installed on the computing device. A striker may carry in and carry out one of the computing devices when entering or leaving the striking area 110. At any given time, the striking area 110 can have zero, one, or more than one computing device in the striking area 110.

The client software for each computing device 125A-C can generally initiate requests to the tracking system 100. The request can be a request to initiate a striking session. A striking session is a time period in which a striker strikes objects from the striking area 110. The client software can receive input indicating the start and end of a striking session from the striker.

As part of initiating the striking session, the tracking system 100 can determine whether the computing device for the requesting client software has previously communicated with the tracking system 100. If not, the tracking system 100 can generate a new striker profile for the striker and associate the profile with the computing device. If the computing device has previously communicated with the tracking system, e.g., has previously sent a request to initiate a striking session, the tracking system can transmit information maintained as part of a striker profile for a striker associated with the computing device, including information recorded during previous striking sessions for the striker.

The tracking system 100 tracks information corresponding to the striker having the computing device during the striking session and provides the information to the computing device through the client software. The client software can receive input indicating the start and end of a striking session from the striker.

The client software can receive statistical information corresponding to a striking session for the respective striker of a corresponding computing device for the client software, as well as receive information for rendering, on the display of a corresponding computing device, a simulated golf shot animation and/or a ball tracing overlay in a virtual golf game and/or in an augmented reality golf shot viewer.

The statistical information can be related to each object as the object is struck from the striking area 110, e.g., the trajectory and speed of the object as the object is in motion. The information tracked can include performance information for the striker during a current striking session, previous striking sessions, or both. For example, the tracking system 100 can provide information about the rate and speed in which the striker strikes objects, e.g., hits golf balls, from the striking area 110 into the target area 120.

Figure 2:
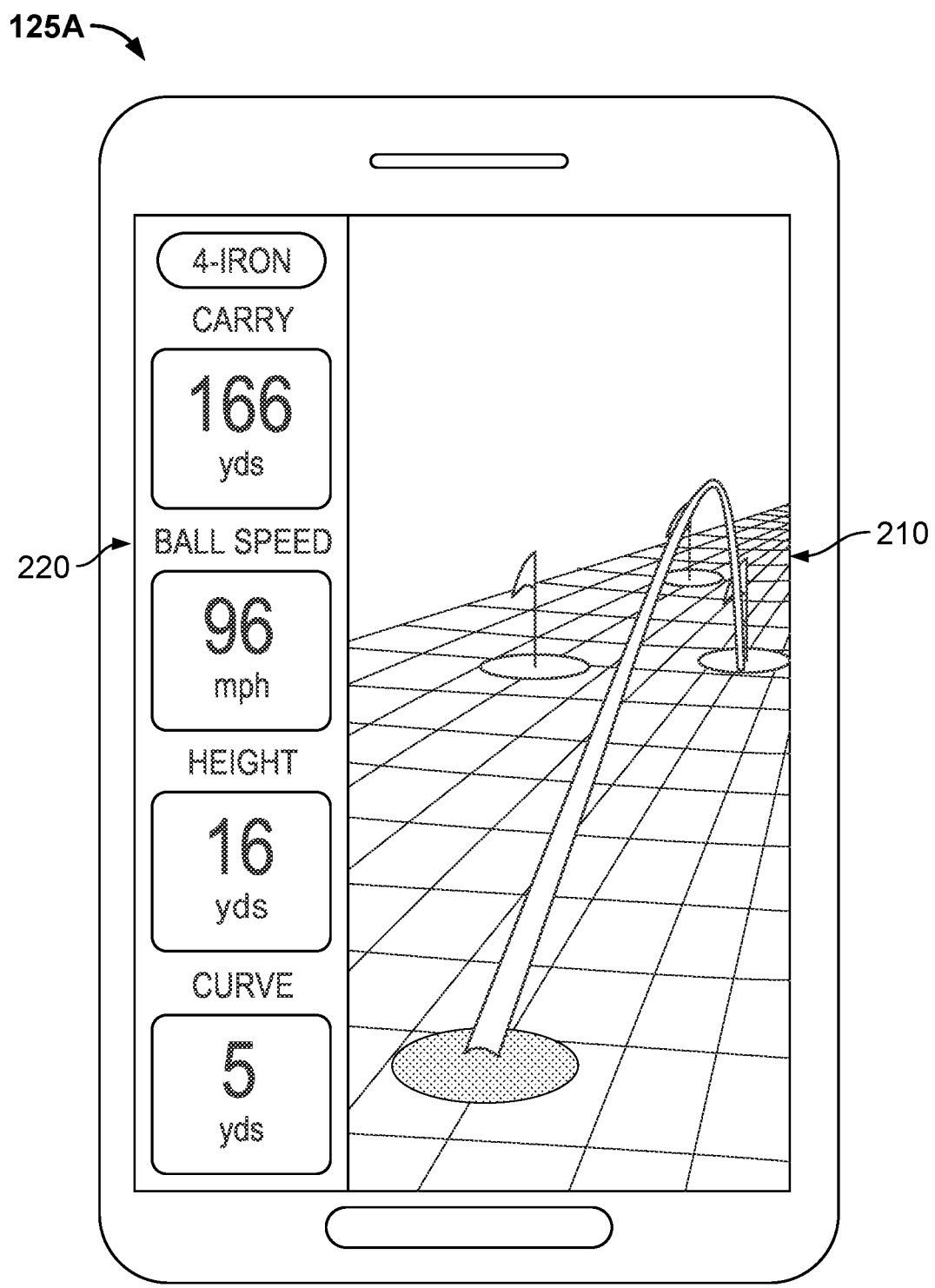
FIG. 2 shows an example of a computing device displaying a simulated object strike animation and statistical information.

FIG. 2 shows an example of a computing device 125A displaying a simulated object strike animation 210 and statistical information 220. In this example, the computing device 125A sent a request to initiate a striking session, and the tracking system 100 responded to the request by associating a physical location in the striking area 110 with the computing device 125A. The simulated object strike animation 210 shows an extrapolated trajectory for an object observed by the tracking system 100 struck from the associated physical location. The tracking system 100 sends information defining the extrapolated trajectory to the computing device 125A, and can also send the statistical information 220. The simulated object strike animation 210 shows the extrapolated trajectory for the object backward and forward in time. The tracking system 100 can send the extrapolated trajectory and the statistical information 220 to the computing device 125A while the object is still in motion. The statistical information 220 can include a speed of the struck object, a maximum height of the struck object, a maximum distance travelled by the struck object, and an angle of the arc of the struck object's trajectory.

Figure 3:
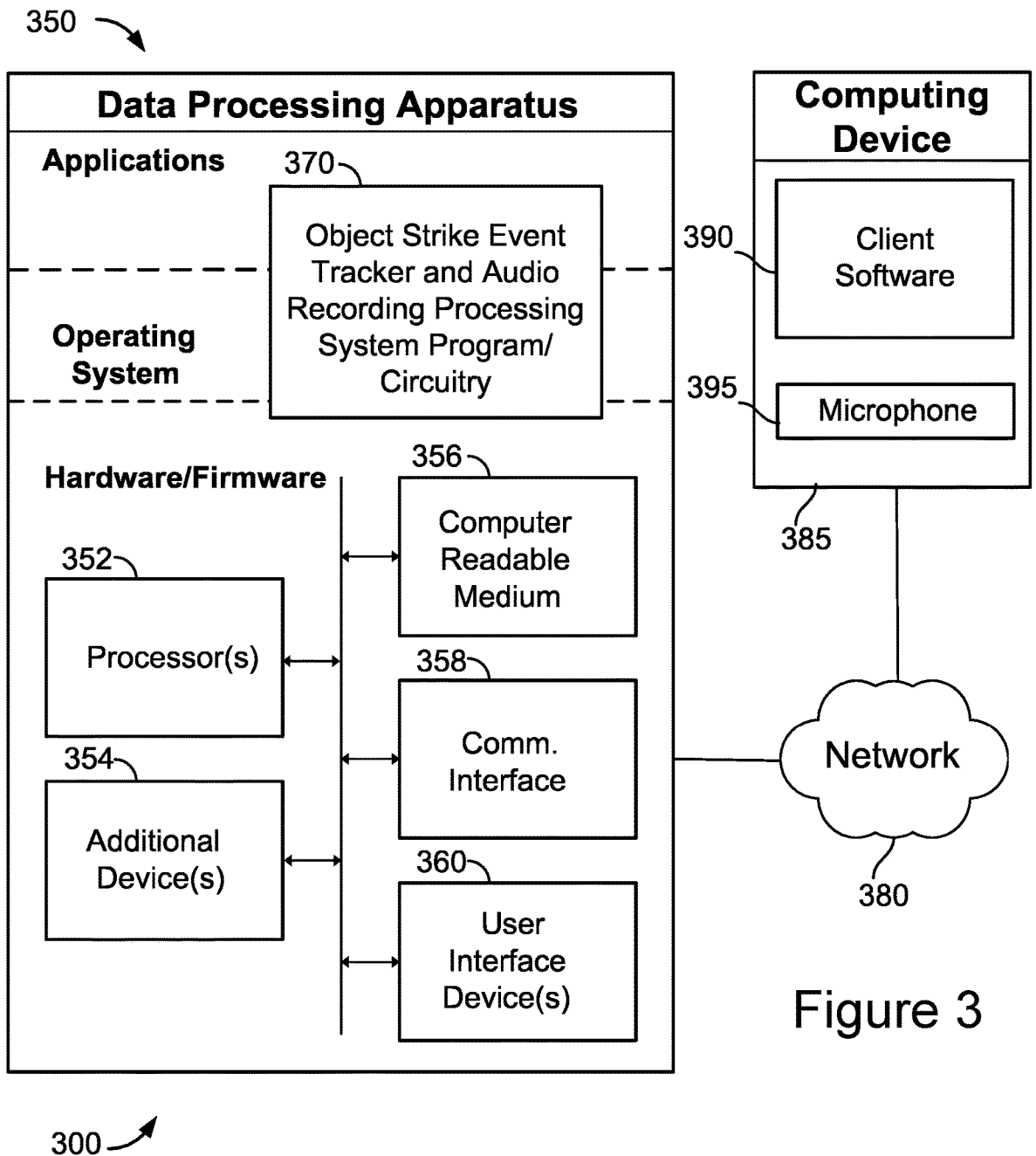
FIG. 3 is a schematic diagram of a data processing system that includes a data processing apparatus that identifies a location of a computing device.

As shown in FIG. 3, a data processing system 300 includes a data processing apparatus 350 that identifies a location of a computing device for a striker that struck an object from a striking area 110 tracked by the tracking system 100. The data processing apparatus 350 can be connected through a network 380 with one or more computing devices, including computing device 385, 125A-C, operated by a respective striker in the striking area 110 tracked by the tracking system 100. The tracking system 100 implements the data processing system 300 on the computers 350, 385, and 125A-C.

The data processing apparatus 350 can include various software modules, which can be distributed between an applications layer and an operating system. These can include executable and/or interpretable software programs or libraries, which can include a program 370 that operates as an object strike event tracker and an audio recording processing system. The number of software modules used can vary from one implementation to another, and the software modules can be distributed on one or more data processing apparatus connected by one or more computer networks or other suitable communication networks.

Moreover, in some cases the functions described are implemented (in part or fully) in firmware and/or hardware of the data processing apparatus 350 to increase the speed of operation. Thus, program(s) and/or circuitry 370 can be used to implement an object strike event tracker and an audio recording processing system, as detailed in this disclosure.

The functions that can be implemented by the computing devices 385, 125A-C can be implemented using various elements of the data processing apparatus 350, as described in further detail below. For the functions related to observing and tracking strike events in the striking area 110, the computing devices 385, 125A-C can receive, over the network 380, sensory data and object tracking data that has been generated by the data processing apparatus 350. With the received data, the computing devices 385, 125A-C can establish a corresponding physical location in the striking area 110, as described in more detail below.

The data processing apparatus 350 can include hardware or firmware devices including one or more hardware processors 352, one or more additional devices 354, a computer readable medium 356, a communication interface 358, and one or more user interface devices 360. Each processor 352 is capable of processing instructions for execution within the data processing apparatus 350. In some implementations, the processor 352 is a single or multi-threaded processor. Each processor 352 is capable of processing instructions stored on the computer readable medium 356 or on a storage device such as one of the additional devices 354. Thus, in various implementations, the processes described can be run in parallel or serially, on a single or multi-core computing machine, and/or on a computer cluster/cloud, etc.

The additional device(s) 354 can include a repository for storing information tracked by the tracking system implementing the data processing apparatus 350. The repository can be one or more memory devices, which themselves can be local to the data processing apparatus 350, e.g., connected by wires or as part of a composite circuit that includes the processor(s) 352; or remote to the data processing apparatus 350 and accessed over the network 380. The data processing apparatus 350 can store data for strike events recorded by the tracking system. Additionally, the data processing apparatus 350 can store additional information, e.g., the statistical information and extrapolated trajectory information, described above with reference to FIG. 1 and FIG. 2.

The data processing apparatus 350 uses its communication interface 358 to communicate with the computing devices 385, 125A-C. Specifically, the communication interface 358 facilitates receiving requests and communicates with the computing devices 385, 125A-C to initiate audio recordings. The tracking system implemented using the data processing apparatus 350 receives requests from computing devices, including the computing devices 385, 125A-C. In response, and as described in detail below, the tracking system can determine whether a strike time in the audio recording matches a strike time of a strike event for an observed object.

In some implementations, the computing device 385 generates audio recordings without sending an initial request and communicating with the data processing apparatus 350. Instead, the computing devices 385, 125A-C begin recording audio and then analyze the recorded audio for object strikes automatically upon receiving an indication, e.g., user input, to initiate a striking session.

From the analyzed audio, the computing devices 385, 125A-C can provide the timestamps of the heard strikes to the data processing apparatus 350 to match the heard strikes with strikes observed in the striking area 110. In some implementations, instead of sending the timestamps to the data processing apparatus 350, the computing devices 385, 125A-C request sensory data, including object strike observations and extrapolated trajectories, from the data processing apparatus 350. Using the requested data and the timestamps obtained from analyzing the audio recording, the computing devices 385, 125A-C can match observed object strikes with heard strikes that occur near-in-time, as described in more detail below.

Examples of user interface devices 360 include a display device, a touchscreen display device, a camera, a speaker, a microphone, a tactile feedback device, a keyboard, and a mouse. The data processing apparatus 350 can store instructions that implement operations detailed in this disclosure, for example, on the computer readable medium 356 or one or more additional devices 354, such as one or more of a floppy disk device, a hard disk device, an optical disk device, a tape device, and a solid state memory device. In general, computer readable medium 356 and one or more additional devices 354 storing instructions are examples of at least one memory device encoding instructions configured to cause at least one hardware processor to perform operations as detailed in this disclosure.

The additional device(s) 354 include the sensor 140 such as when a sensor and computer are integrated together into a self-contained tracking system, e.g., the tracking system 100. The sensor 140 can also be located remotely from the data processing apparatus 350, and the data from the sensor 140 can be obtained using one or more communication interfaces 358, such as interfaces for wired or wireless technologies. In some implementation, the additional device(s) 354 include one or more additional sensors implemented to collect sensory data from the striking area 110.

The computing device 385 has installed client software 390 which can send a request to initiate a striking session to the tracking system implementing the data processing apparatus 350. The client software 390 can receive, in response to the request, a prompt for an audio recording of the striker operating the computing device 385 striking an object. The client software 390 can prompt the striker to record the audio recording, using a microphone 395 on the computing device 385, and submit the audio recording for processing by the data processing apparatus 350. Further, in some implementations, the client software 390 performs one or more of the functions ascribed to the data processing apparatus 350, such as processing of the audio recording to identify a strike event.

Figure 4:
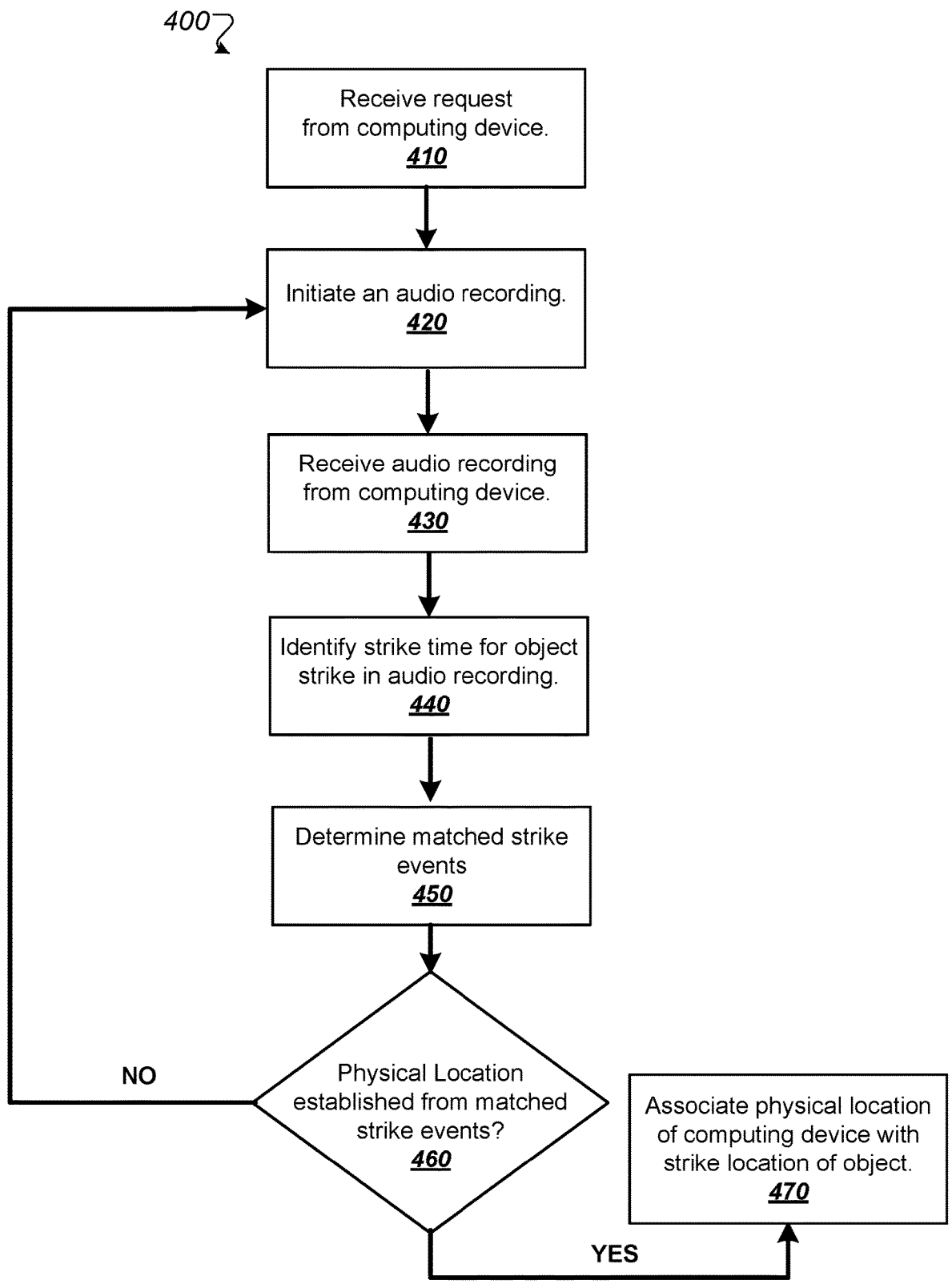
FIG. 4 is a flowchart showing an example of a process of identifying a location for a computing device for a striker of an object in a target area tracked by a tracking system.

FIG. 4 is a flowchart showing an example of a process 400 of identifying a location for a computing device for a striker of an object in a target area tracked by a tracking system. For convenience, the process 400 will be described as being performed by a system of one or more computers, located in one or more locations, and programmed appropriately in accordance with this specification. For example, a tracking system, e.g., the tracking system 100 of FIG. 1, appropriately programmed, can perform the process 400.

The tracking system receives 410 a request from a computing device implementing client software appropriately configured to communicate with the tracking system. The request can be a request to begin a striking session, as described above with reference to FIG. 1 and FIG. 2. In some implementations, the computing device receives a request to begin a striking session from a user having the computing device, and proceeds to perform operations towards establishing the striking session automatically and without sending the request to the tracking system, initially.

The tracking system initiates 420, in response to the request, an audio recording by a microphone of the computing device. As part of initiating the audio recording, the client software of the computing device prompts the striker, e.g., by displaying a prompt on a display of the computing device, to position the computing device and strike the object from a location within the striking area. In some implementations, instead of the tracking system initiating the audio recording, the client software prompts the striker to position the computing device and strike the object automatically after receiving a request to establish a striking session.

The prompt can include a set of instructions to the striker as to where to position the computing device to increase the likelihood of a recording that properly records the audio at the moment an object is struck by the striker. For example, the prompt can be voice or text instructions to a striker to place the computing device on the ground proximate to the location in which the object will be struck, e.g., within a meter. The prompted distance can be predetermined based on how close a computing device needs to be, on average, to accurately record the audio of a struck object. The prompted distance can also be predetermined considering how far the computing device needs to be to prevent accidental collision with the computing device by the striker or an implement of the striker while striking the object.

The prompt also includes a user interface element, e.g., a button displayed on the display of the computing device, for interacting with the client software. The client software can receive an input from the striker, e.g., by gesture, voice, mouse-click, or touch, through the user interface element. In response to receiving an input from the user interface element, the client software begins counting down from a predetermined countdown time, e.g., 10 seconds. In some implementations, rather than setting a countdown, the computing device automatically begins recording and continues recording until a strike event is identified in the recording.

After the predetermined countdown time elapses (in implementations in which a countdown is set), the computing device begins recording audio. The predetermined countdown time allows a striker to position the computing device and prepare to strike an object. In some implementations, the client software can receive input from the user to adjust the countdown time. The computing device can indicate when the countdown begins and ends, e.g., using audio tones, graphics or colors on the display of the computing device, or by speaking to the striker. After the countdown, the client software begins recording audio. The client software can stop recording after a predetermined interval of time, e.g., 4 seconds.

The computing device can record the audio recording in any conventional format for storing audio, e.g., as an MP3, WAV, or FLAC audio file. Regardless of the file format, the client software includes additional metadata representing timestamps for points in time of the recording. The points can be uniform and predetermined, e.g., each point is a millisecond.

The client software can obtain an accurate time from a source shared by the tracking system, e.g., using an API to access an accurate time maintained by a trusted source. In some implementations, the client software obtains a current time from the tracking system. In some implementations, the client software periodically obtains the time from the tracking system to ensure that the separately maintained clocks for the tracking system and client software are accurate within a predetermined margin of error, e.g., 5 milliseconds.

In some implementations, as part of the request, the computing device also sends a request for a current time maintained by the tracking system. In response, the tracking system initiates the audio recording, and also transmits a current time tracked by the tracking system.

In some examples of initiating the audio recording, the tracking system sends an indication to the requesting computing device that the request has been received. In response to the indication, the computing device can begin the audio recording. In some implementations, the computing device sends the request and begins the audio recording automatically, e.g., without receiving an indication from the tracking system.

The tracking system can receive 430 the audio recording from the computing device. The tracking system can identify 440 a strike time for an object strike in the audio recording. Instead of the tracking system analyzing the audio recording to identify 440 a strike time for an object strike, in some implementations, the computing device performs the analysis without sending the audio recording to the tracking system. The computing device can employ the techniques described below with respect to identifying 440 a strike time for an object strike in the audio recording.

In general, the tracking system or computing device identifies the strike time by matching audio in the audio recording with an audio signature of an object being struck. For example, the audio signature can be a waveform of the sound of an object being struck, e.g., a golf ball hit by a club. The tracking system or computing device can generate a waveform for the audio recording, and analyze the waveform for a portion matching the audio signature waveform within a predetermined threshold difference. The predetermined threshold difference can be manually adjusted to reduce false positives and/or false negatives in identifying audio of a struck object in the audio recording.

In some implementations, the tracking system or computing device implements a machine learning model, e.g., a neural network, trained to receive an audio recording, as input, and to generate, as output, one or more timestamps during the audio recording of identified strike events. The tracking system can train the machine learning model, e.g., using a supervised learning technique, from training data that includes audio recordings and ground-truth timestamps indicating when strike events occurred during the audio recordings in the training data.

The model can be trained using the one or more computers implementing the tracking system. In some implementations, the model is trained on one or more computers different from those implementing the tracking system. In those implementations, the tracking system implements the trained model prior to receiving a request to establish a striking session. At inference time, i.e., after the audio is recorded and received from the computing device, the tracking system receives an audio recording and processes the audio recording through the model to obtain timestamps for strike events heard in the recording. In some implementations, the computing device implements the machine learning model and processes the audio recording to obtain one or more timestamps for strike events.

In some implementations, the tracking system or computing device identifies audio for a struck object in the audio recording without using an audio signature. Instead, the tracking system or computing device analyzes the audio recording for excerpts having audio properties consistent with predetermined audio properties of the sound of an object strike. For example, the tracking system analyzes the audio recording for sounds of a certain pitch, volume, frequency, and/or duration for portions of audio in the audio recording with some or all of these audio properties.

If the tracking system or computing device identifies audio in the audio recording that corresponds to a strike event, by matching an audio signature or audio properties or by using a machine learning model, the tracking system or computing device then identifies a strike time for the matching audio. The strike time is generally a timestamp of a time corresponding to when a match is identified in the audio recording. For example, the strike time for the matching audio can be the timestamp when the matching audio begins in the audio recording. As another example, the strike time can be the time at which the matching audio ends, or some point in between the beginning and the end of the matching audio. In some implementations, the strike time is a time range during which the strike occurred.

The matching audio can include more than the sound of the object as it is struck. For example, the matching audio can include sounds occurring after the object strike, such as the reverberation of a striking golf club heard after a golf ball is hit. The tracking system will use the strike time to determine whether the tracking system observed a matching strike event during the interval of time the audio was recorded.

In some implementations, the tracking system or computing device can filter out ambient noise in the audio recording, before identifying a strike time. Ambient noise is any noise heard in or near the striking area when strikers are not present, e.g., running water, sounds of nearby traffic, or birds chirping. The tracking system or computing device filters out ambient noise, e.g., by applying an audio mask over the audio recording or by processing the audio recording through an audio processing program for reducing or eliminating ambient noise.

In some implementations, the tracking system filters out ambient noise by processing several audio recordings taken at the striking area. The tracking system determines, from the several recordings, common sounds that are not identified as sounds of object strikes. The tracking system can then automatically filter out these common sounds, which can be part of the ambient noise of the striking area or can be sounds found to lead to false positive identifications by the tracking system.

In some implementations, instead of receiving the audio recording, the tracking system receives timestamps from the computing device of strike events identified in the audio recording by the computing device. In this way, the amount of data sent over the network from the computing device to the tracking system can be reduced by avoiding having to send the entire recording when only the timestamps of the identified strikes are relevant for determining matched events.

In some implementations, the computing device receives an audio mask generated by the tracking system from the several recordings previously received by the tracking system. The computing device uses the audio mask to automatically filter out common sounds in the audio recording, according to the mask.

The tracking system or computing device determines 450 matched strike events. An observed strike event is said to "match" a strike identified in the audio recording when the strike time for the observed strike event occurs within a threshold of time, e.g., 1.5 seconds, to the strike identified in the audio recording. The tracking system can match a strike heard in the audio recording with one or more strike events observed from the striking area occurring within a threshold of time to the strikes in the audio recording. For each matched strike event, the tracking system can provide the strike event with a unique identifier. The identifier for each strike event can be unique to the strike location for the event.

In some implementations, the computing device determines 450 matched strike events. As part of determining matches, the computing device requests data from the tracking system identifying strike events observed in the striking area at the time the computing device recorded audio. The computing device can send the time range during which audio was recorded, and the tracking system can send strike events identified as having occurred in that time range.

Figure 5:
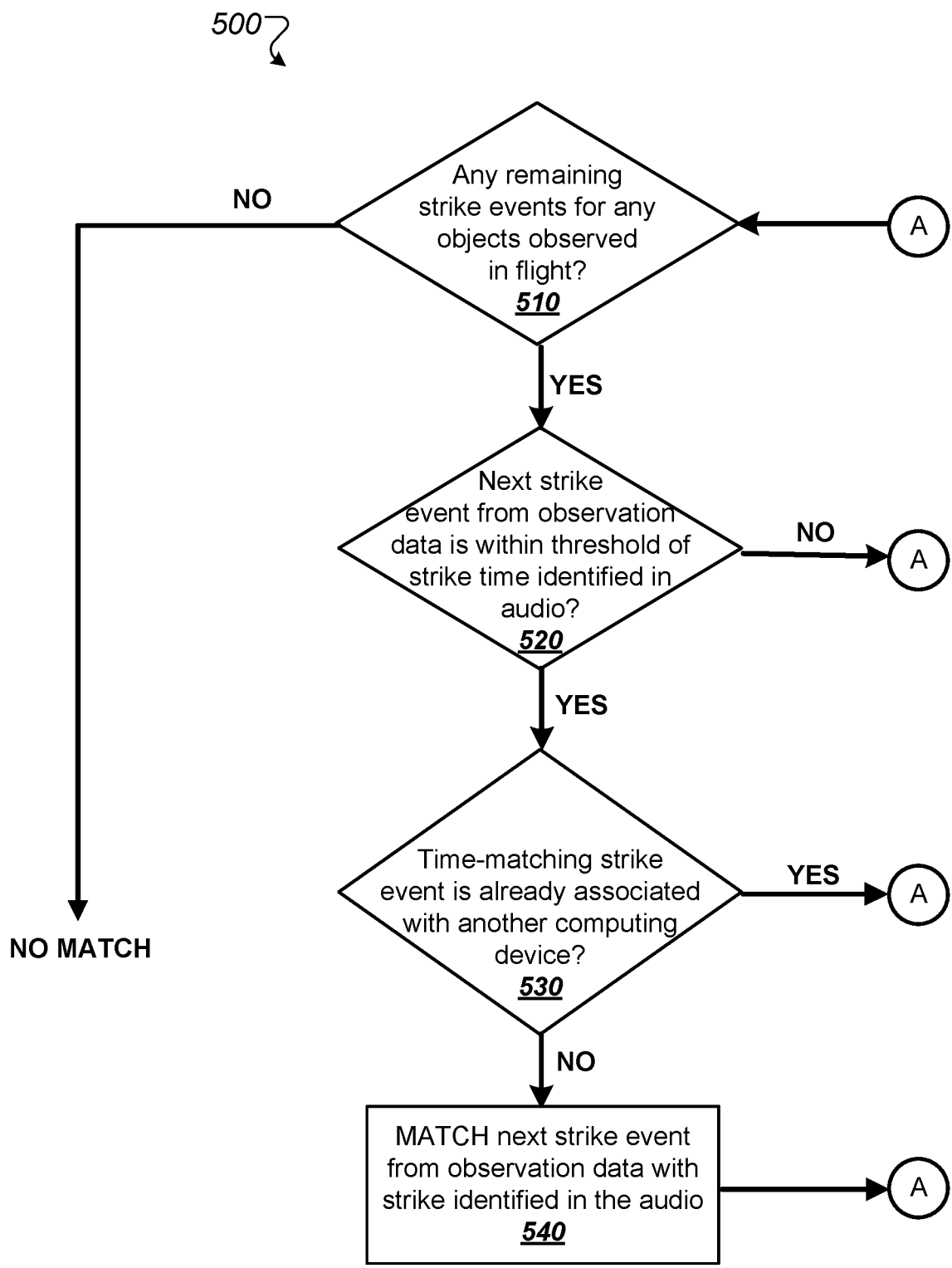
FIG. 5 is a flowchart showing an example of a process of matching a strike time for an object in flight and a strike time in an audio recording.

As described below, the tracking system or computing device can maintain each assigned identifier and can use the identifiers in establishing the physical location for the requesting computing device. FIG. 5, below, describes how in some implementations the tracking system matches strike times for objects in flight with strike times of audio identified in a received audio recording. In general, objects in flight after receiving the audio recording are candidates for being objects recorded in the audio recording, i.e., the objects in flight are likely to have been struck during the predetermined interval of time.

The tracking system or computing device determines 460 whether a physical location for the requesting computing device can be established from matched strike events. The tracking system or computing device establishes a physical location from matched strike events based on whether the tracking system or computing device deems the location trustworthy.

For example, if exactly one match is determined 450 because only one object was struck at the same time that a strike is identified in the audio recording, then this single match after only a single recording can be deemed trustworthy enough to accept, and thus the computing device that made the recording is associated with the originating location of the struck object observed by the tracking system. But in other cases, more than one audio recording will be needed before a position of the striker can be accurately identified.

In some implementations, the computing device can begin additional audio recordings after the initial audio recording. The computing device can prompt the user and/or indicate when the audio recording will begin, e.g., as described above. In some implementations, the additional audio recordings begin without user input before each additional audio recording, and begin to record automatically.

The tracking system or computing device deems a physical location to associate with a computing device as trustworthy based on matched strikes from the presently analyzed audio recording, and possibly one or more audio recordings recorded and analyzed previously. Generally, a trustworthy location is a location from which matched strike events are consistently identified as occurring. If the tracking system or computing device identifies matched strike events occurring within a same physical location, e.g., within 1.5 meters of each other, then those matches correspond to a physical location more likely to be the location to be associated with the computing device, hence more "trustworthy."

The standard for deeming a location trustworthy relates to several factors, e.g., the number of strikes heard in the audio recording, the number of observed strike events from the striking area, and the matched strike events from previous audio recordings. The standard for trustworthiness of the location can vary from implementation-to-implementation, with stricter or more lenient standards for deeming a physical location trustworthy.

There exists a balance in setting the standard for trustworthiness higher or lower. A higher standard for trustworthiness, e.g., a higher minimum number of recordings with matched strikes within a threshold distance of a location, can help to ensure that the physical location associated with the computing device is accurate. A lower standard for trustworthiness, e.g., only one audio recording or a lower minimum number of recordings before deeming a location trustworthy, can improve the user experience by making the overall process of establishing a session quicker, at the cost of potential inaccuracies in establishing the physical location for the computing device.

Consider the example in which the tracking system or computing device matches a strike event at location P. As part of determining whether to establish the location P as the physical location to associate with the computing device, the tracking system or computing device determines whether a strike event in a previous audio recording was matched with a location at or near, e.g., within 1.5 meters, the location P. In some implementations, if the tracking system or computing device does not have previous audio recordings from which to compare previously matched strike events, e.g., because the tracking system or computing device is currently analyzing the first audio recording for establishing a striking session, then the tracking system or computing device does not deem the location P trustworthy. Instead, the tracking system or computing device initiates 420 a new audio recording.

Continuing the example, above, the tracking system or computing device initiates 420 a new recording, the tracking system receives 430 the recording (in implementations in which the tracking system analyzes the audio recording), identifies 440 strike times for object strikes heard in the audio recording, and determines 450 matched strike events in the new audio recording.

In the new recording, the tracking system or computing device determines 460 a matched strike event within a threshold distance of location P. In determining 460 whether the location P is trustworthy, the tracking system or computing device analyzes matches of previous recordings, and determines that a previous strike event was matched within a threshold distance of the location P. The confidence the tracking system or computing device has in deeming the location P as trustworthy has increased, because now the tracking system or computing device has matched a second strike event within a threshold distance of a location P of the first strike event.

At this point in the example described, the tracking system or computing device deems the location P as trustworthy for associating with the computing device. In some implementations, the tracking system or computing device does not deem the location P as trustworthy, for example because the standard for trustworthiness is set to require a minimum number of matches between recordings, e.g., three matches across three recordings. The number of matches across recordings for deeming a location as trustworthy can vary from implementation-to-implementation.

In some implementations, the trustworthiness of a location P is established not only by the number of strike events matched at or near the location P, but whether the strike events occur in consecutively recorded audio recordings. For example, the tracking system or computing device can consider the location P trustworthy only if three audio recordings consecutively recorded resulted in three strike events all occurring at or near the location P.

In some implementations, the tracking system or computing device can deem a physical location P as trustworthy by analyzing only one audio recording. In some implementations, the tracking system or computing device uses additional information obtained about the tracking area, e.g., the number of other strikers currently in a striking session in the striking area, or the "traffic" of objects struck from the striking area. Specifically, the additional information collected about the striking area can affect the standard of trustworthiness, e.g., lower or raise the standard.

If, for example, the tracking system has not established any current striking sessions with any other strikers in the striking area, then the tracking system can deem a physical location trustworthy after just one audio recording, reflecting the situation in which the striker having the computing device is alone and therefore the only source of object strikes in the striking area. In another example, only one object strike is observed at the striking area during the time in which the tracking system or computing device analyzes the sensory data and the audio recording for matched events. The tracking system or computing device can deem a physical location identified from a matched strike event as trustworthy, reflecting the situation in which, even if the striker is not alone in the striking area, the striker is very likely to have been the only one striking an object at the time the audio is recorded.

As another example, the standard of trustworthiness can scale depending on the volume of object strike traffic and/or number of strikers in the striking area. As the volume of object strike traffic, i.e., the number of object strikes observed in the air at any given time, increases, the tracking system or computing device can impose a higher standard of trustworthiness, reflecting caution in making sure an error is not made in establishing a physical location for a requesting computing device. Similarly, the number of other strikers in the striking area can also cause the tracking system or computing device to impose a higher standard of trustworthiness, to mitigate the chance of error.

If the tracking system establishes a physical location from the matched strike events, then the tracking system associates 470 the physical location with the computing device for the striker. The tracking system further associates the client software, e.g., a user profile of the user of the computing device that is logged into the client software, with the physical location. Thereafter, the tracking system can transmit information to the computing device for strike events observed having a strike location that is the same as the physical location. In implementations in which the computing device establishes the physical location, the computing device sends data specifying the physical location to the tracking system, and the tracking system associates the physical location with the computing device.

In some implementations, if the tracking system or computing device determines matches within a threshold distance of a location P as part of establishing the location P, then instead of deeming the location P trustworthy and establishing 460 the location P, the tracking system or computing device instead computes an average location of the strike locations for each matched strike event located within the threshold distance of the location P. Then, the tracking system or computing device establishes the average location of the strike location as the location to associate 470 with the computing device. The tracking system or computing device can compute the average location in any suitable manner, e.g., by computing a midpoint between the strike locations of each matched strike event.

FIG. 5 is a flowchart showing an example of a process 500 of matching a strike time for an object in flight and a strike time in an audio recording. The process 500 is an example of determining 450 matched strike events, as described in FIG. 4 and its accompanying description, above. In some cases, the tracking system or computing system has to determine matched strike events between a single heard strike in the audio recording, and multiple strike events observed by the tracking system. The process 500 is a process for matching a heard strike with one or more of multiple strike events observed by the tracking system.

Although the process 500 is described in the context of a single audio identified strike event, the process 500 can be performed for each of multiple audio identified strike events of an audio recording.

For convenience, the process 500 will be described as being performed by a system of one or more computers, located in one or more locations, and programmed appropriately in accordance with this specification. For example, a tracking system or computing device, e.g., the tracking system 100 or the computing device(s) 125A-C of FIG. 1, appropriately programmed, can perform the process 500.

If the tracking system determines a MATCH, then the strike event with the matching strike time and its corresponding strike position is assigned an identifier. The tracking system uses the identifiers assigned to strike events to narrow down the location of the computing device sending the audio recording, which is important in cases in which the tracking system matches two or more strike events with a strike time identified in an audio recording.

The tracking system determines 510 whether there is at least one strike time in the audio recording. If not, then the tracking system returns NO MATCH. Otherwise the tracking system or computing device proceeds with the process 500.

Next, the tracking system determines 520 whether a next strike event from observation data obtained from the tracking system is within a threshold of a strike time identified in the audio recording. An example threshold of the strike time is 0.5 seconds.

In some implementations, the tracking system can dynamically adjust the threshold of time per-request. For example, the tracking system may increase the threshold of time depending on the number of identified strikers currently in the striking area. If there are few or no other strikers besides the striker operating the requesting computing device, then the threshold of time can be made longer than if the striking area is more populated. Adjusting the threshold of time can improve user experience and mitigate the risk of not accurately associating a strike event with audio in a given recording.

As another example for dynamically adjusting the threshold, the tracking system can adjust the threshold based on latency detected in the network connecting the tracking system and the computing device. If the network latency is higher, the tracking system sets the threshold higher to compensate for any issues the latency causes in synchronizing strike times for objects observed from the striking area. Similarly, the tracking system can set the threshold lower following a determination that network latency is below a pre-determined amount. Synchronization and compensating for network latency can also be important in implementations in which the computing device relies on the tracking system to synchronize a time prior to recording audio.

The tracking system can also dynamically adjust the threshold based on audio quality of the audio recorded strike event. The tracking system or computing device can gauge the audio recording based on signal strength to determine an audio quality. The higher the audio quality, the more confident the tracking system is against false positives with sounds that are not actually of object strikes. As a result, the tracking system can increase the threshold. Similarly, if the audio quality is lower, e.g., below a pre-determined value, then the tracking system can lower the threshold to mitigate the chance of matching an object strike with errant sounds heard in the recording but not of object strikes.

Regardless of how the threshold is set, if no strike event is recorded within the threshold of strike time, then the tracking system returns NO MATCH. Otherwise, the tracking system or computing device proceeds with the process 500.

The tracking system or computing device determines 530 whether the time-matching strike event is already associated with another computing device. For example, the tracking system filters out strike events for objects struck at locations previously associated with computing devices of other strikers in the striking area.

If, after filtering, the time-matched strike event is found to already be associated with another computing device, the tracking system does not match, and proceeds to the next strike event from the observation data. Otherwise, the tracking system or computing device MATCHES the strike event from the observation data with the audio identified strike. The process 500 can repeat for each strike event identified from the observation data obtained by the tracking system, until all strike events are analyzed.

In some implementations, the client software performs one or more operations described above with reference to FIG. 4 and FIG. 5. Specifically, in some implementations, the computing device can receive the request to begin a striking session, and initiate an audio recording. The computing device can then identify strike time(s) in the audio recording, as described above with reference to FIG. 4. The computing device can send the identified strike time(s) to the tracking system for determining a MATCH against strike events observed while the computing device was recording the audio.

Figure 6:
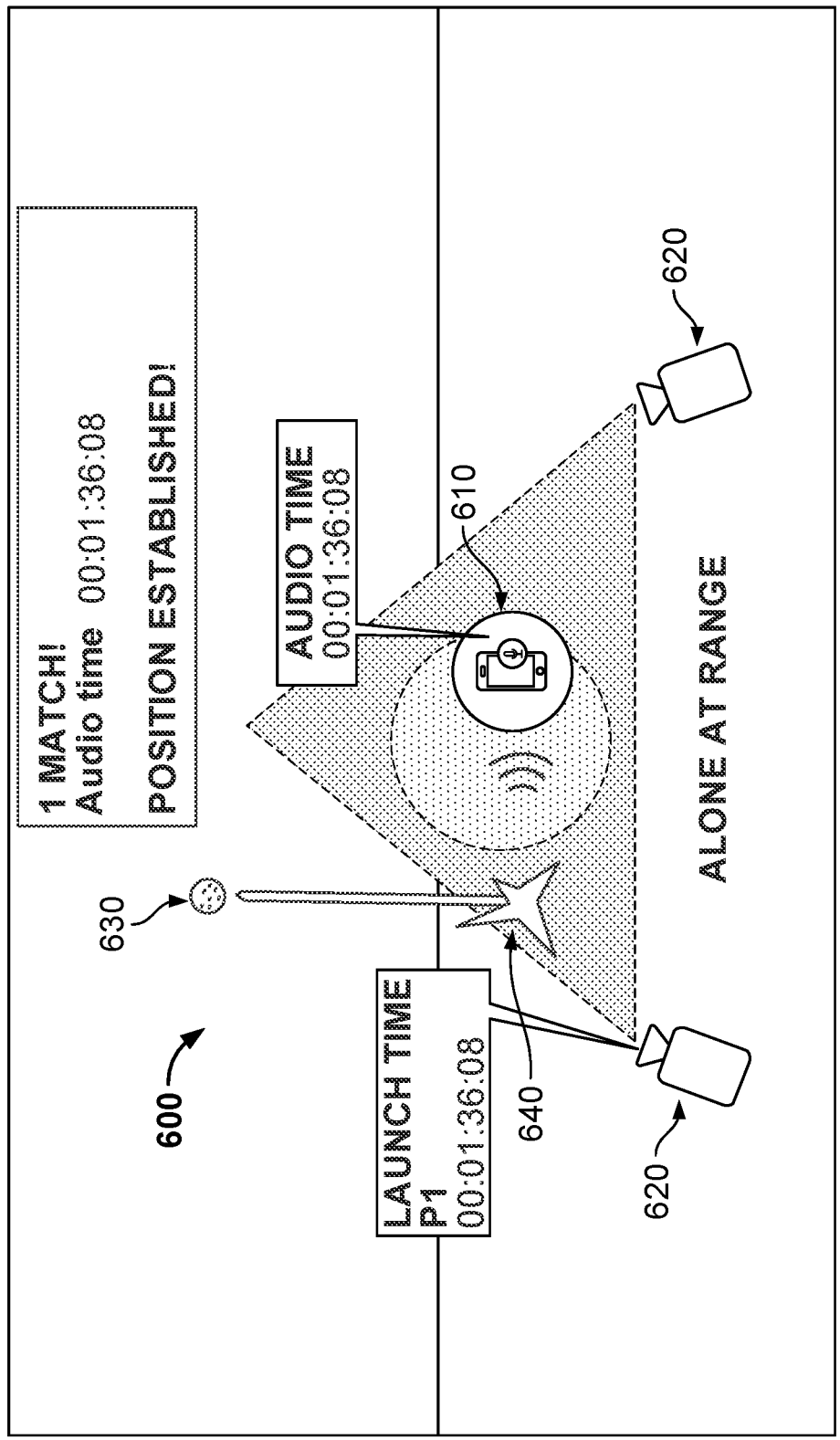
FIG. 6 shows an example of a striking area with a single computing device and one observed object.

FIG. 6 shows an example of a striking area 600 with a single computing device 610 and one observed object 630. In this example, a tracking system observes objects struck from the striking area 600 using cameras 620. Also in this example, the computing device 610 records audio during a predetermined interval of time. The tracking system receives the audio recording, and identifies a strike time of 00:01:36:08. An object 630 is observed in motion by the cameras 620 after the tracking system receives the audio recording from the computing device 610. The tracking system identifies a strike time of 00:01:36:08 for the object 630, e.g., by computing an extrapolated trajectory. The tracking system also identifies a strike location 640 for the object 630, and associates the strike location 640 as the physical location of the computing device 610.

Figure 7:
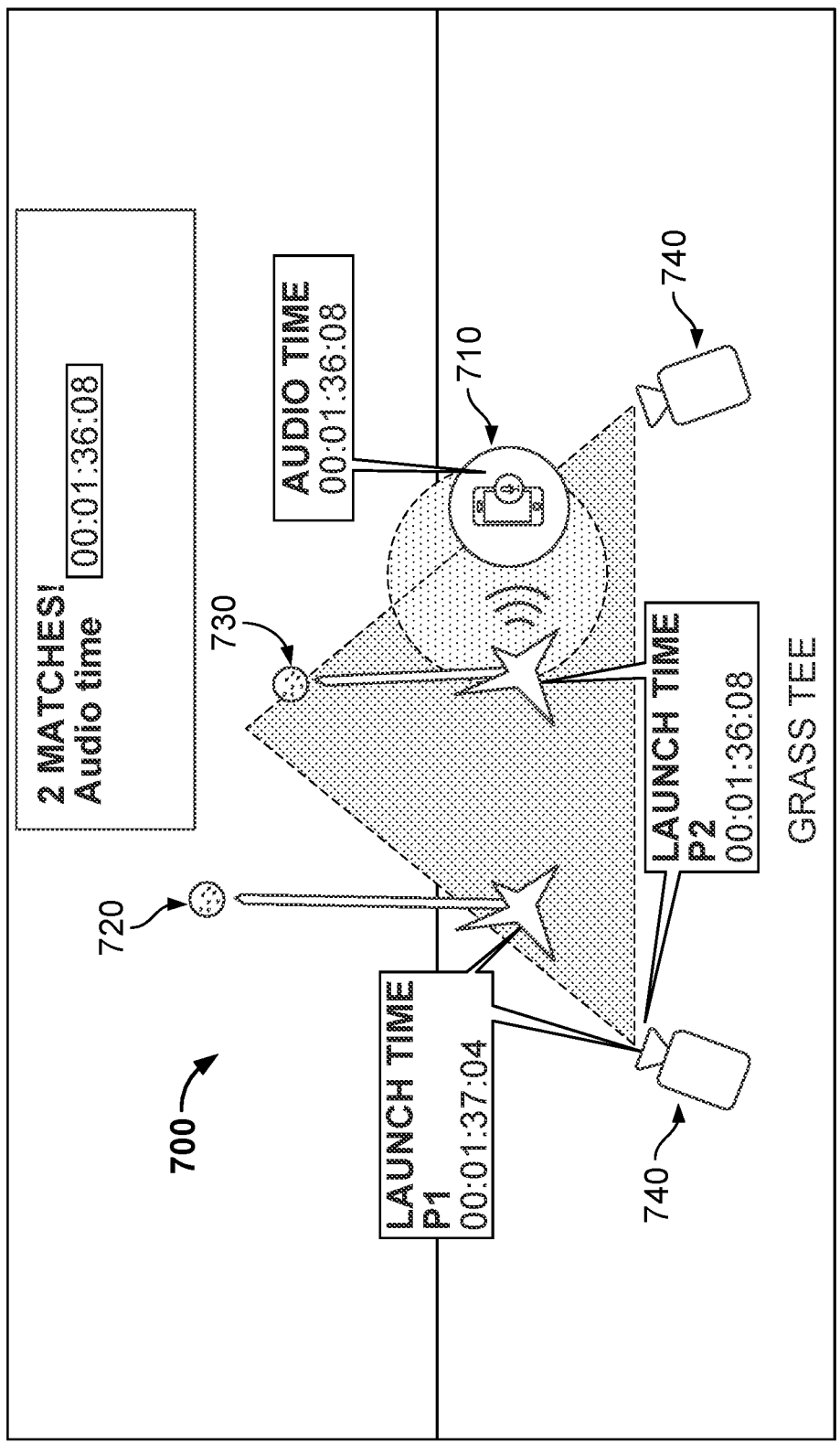
FIG. 7 shows an example of a striking area with a single computing device and two observed objects.

FIG. 7 shows an example of a striking area 700 with a single computing device 710 and two observed objects 720, 730. In this example, a tracking system observes objects struck from the striking area 700 using cameras 740. Also in this example, the computing device 710 records audio during a predetermined interval of time. The tracking system receives the audio recording, and identifies a strike time of 00:01:36:08.

The tracking system identifies a strike time of 00:01:37:04 for the object 720, and also identifies a strike time of 00:01:36:08 for the object 730. In this example, the strike times for both objects 720 and 730 are within a threshold of time for matching with the strike time in the audio recording For example, the threshold of time can be 0.5 seconds. The tracking system assigns strike events corresponding to the objects 720 and 730 with different identifiers, and initiates a new audio recording, i.e., performs the example process 400 and the example process 500, as described above with respect to FIG. 4 and FIG. 5, respectively.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or two or more processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in two or more coordinated files (e.g., files that store one or more modules, sub-programs, or portions of code). A computer program can be deployed to be executed on one computer or on two or more computers that are located at one site or distributed across two or more sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in two or more embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into two or more software products.

Thus, particular embodiments of the invention have been described. Other embodiments are within the scope of the following claims and/or within the scope of the teachings of the present application. For example, the description above focuses on tracking a golf ball shot, but the systems and techniques described are also applicable to other types of object flight tracking, such as for baseball, soccer, or skeet shooting, as well as non-sports applications. In addition, the actions recited in the claims can be performed in a different order and still achieve desirable results.

What is claimed is:

1. One or more non-transitory computer-readable storage media encoded with instructions that, when executed by a mobile computing device comprising a microphone and display, causes the mobile computing device to perform operations comprising:
   sending a request to one or more computers of a tracking system, wherein the mobile computing device is operated by a striker located in a striking area having space for two or more strikers to strike objects into a target area that is observed by one or more sensors of the tracking system;
   receiving, in response to the request, one or more instructions to initiate an audio recording by the microphone;
   generating the audio recording using the microphone;
   sending data of the audio recording to the one or more computers of the tracking system; and
   receiving from the one or more computers of the tracking system, information regarding one or more object strikes for rendering to the display of the mobile computing device, wherein the one or more object strikes originate from a physical location for the mobile computing device in the striking area; and
wherein the one or more non-transitory computer-readable storage media are encoded with instructions that, when executed by the one or more computers of the tracking system, causes the one or more computers of the tracking system to perform operations comprising:
   identifying the physical location in the striking area and a first strike time determination for an object struck from the striking area based on sensor observations of the object in flight between the striking area and the target area;
   identifying a second strike time determination in the audio recording; and
   associating the physical location, which has been identified based on the sensor observations, with the mobile computing device when the second strike time determination is matched with the first strike time determination.

2. The one or more non-transitory computer-readable storage media of claim 1,
wherein the operations of the mobile computing device further comprise displaying a prompt to record the audio recording, and
wherein generating the audio recording comprises recording audio during an interval of time.

3. The one or more non-transitory computer-readable storage media of claim 1, wherein the data of the audio recording is the audio recording in its entirety.

4. The one or more non-transitory computer-readable storage media of claim 1,
wherein the operations of the mobile computing device further comprise identifying a first strike time determination in the audio recording; and
wherein sending the audio recording data comprises sending the first strike time determination to the one or more computers.

5. The one or more non-transitory computer-readable storage media of claim 1, wherein the audio recording is a first audio recording, the physical location is a first physical location, the object is a first object, and the instructions cause, when executed by the one or more computers of the tracking system, the one or more computers of the tracking system to perform operations comprising:
identifying a second physical location for a second object with a strike time determination that matches the second strike time determination;
in response to identifying the second physical location, initiating one or more second audio recordings by the microphone of the mobile computing device until identifying a single strike time determination for an object that matches a strike time determination identified in a second audio recording of the one or more second audio recordings;
identifying a third physical location in the striking area and a third strike time determination for the single object struck from the striking area based on sensor observations of the single object in flight between the striking; area and the target area; and
associating an average physical location computed from the first physical location and the third physical location with the mobile computing device, when the second strike time determination is matched with the first strike time determination, and the third strike time determination is matched with the strike time determination identified from the second audio recording.

6. The one or more non-transitory computer-readable storage media of claim 1, wherein the striking area is a tee area for a golf range.

7. The one or more non-transitory computer-readable storage media of claim 1, wherein the object is a golf ball, and the information regarding one or more object strikes comprises golf shot statistics, a golf shot animation in a virtual golf game, or a combination thereof.

8. A method comprising:
sending, by a mobile computing device comprising a microphone and display, a request to one or more computers of a tracking system, wherein the mobile computing device is operated by a striker located in a striking area having space for two or more strikers to strike objects into a target area that is observed by one or more sensors of the tracking system;
receiving, by the mobile computing device and in response to the request, one or more instructions to initiate an audio recording by the microphone;
generating, by the mobile computing device, the audio recording using the microphone;
sending, by the mobile computing device, data of the audio recording to the one or more computers of the tracking system;
receiving, by the mobile computing device, from the one or more computers of the tracking system, information regarding one or more object strikes for rendering to the display of the mobile computing device, wherein the one or more object strikes originate from a physical location for the mobile computing device in the striking area;
identifying, by the one or more computers of the tracking system, the physical location in the striking area and a first strike time determination for an object struck from the striking area based on sensor observations of the object in flight between the striking area and the target area;
identifying, by the one or more computers of the tracking system, a second strike time determination in the audio recording; and
associating, by the one or more computers of the tracking system, the physical location, which has been identified based on the sensor observations, with the mobile computing device when the second strike time determination is matched with the first strike time determination.

9. The method of claim 8, further comprising displaying, by the mobile computing device, a prompt to record the audio recording; and wherein generating the audio recording comprises recording audio during an interval of time.

10. The method of claim 8, further comprising identifying, by the mobile computing device, a first strike time determination in the audio recording; and wherein sending the audio recording data comprises sending the first strike time determination to the one or more computers.

11. The method of claim 8, wherein the audio recording is a first audio recording, the physical location is a first physical location, the object is a first object, and the method further comprises:
identifying, by the one or more computers of the tracking system, a second physical location for a second object with a strike time determination that matches the second strike time determination;
in response to identifying the second physical location, initiating, by the one or more computers of the tracking system, one or more second audio recordings by the microphone of the mobile computing device until identifying a single strike time determination for an object that matches a strike time determination identified in a second audio recording of the one or more second audio recordings;
identifying, by the one or more computers of the tracking system, a third physical location in the striking area and a third strike time determination for the single object struck from the striking area based on sensor observations of the single object in flight between the striking area and the target area; and
associating, by the one or more computers of the tracking system, an average physical location computed from the first physical location and the third physical location with the mobile computing device, when the second strike time determination is matched with the first strike time determination, and the third strike time determination is matched with the strike time determination identified from the second audio recording.

12. The method of claim 8, wherein the striking area is a tee area for a golf range.

13. The method of claim 8, wherein the object is a golf ball, and the information regarding one or more object strikes comprises golf shot statistics, a golf shot animation in a virtual golf game, or a combination thereof.

14. A system comprising:
a mobile computing device comprising a microphone and display, the mobile computing device being programed to perform operations comprising
sending a request to one or more computers of a tracking system, wherein the mobile computing device is operated by a striker located in a striking area having space for two or more strikers to strike objects into a target area that is observed by one or more sensors of the tracking system,
receiving, in response to the request, one or more instructions to initiate an audio recording by the microphone,
generating the audio recording using the microphone,
sending data of the audio recording to the one or more computers of the tracking system, and
receiving from the one or more computers of the tracking system, information regarding one or more object strikes for rendering to the display of the mobile computing device, wherein the one or more object strikes originate from a physical location for the mobile computing device in the striking area; and
the one or more computers of the tracking system being programed to perform operations comprising
identifying the physical location in the striking area and a first strike time determination for an object struck from the striking area based on sensor observations of the object in flight between the striking area and the target area,
identifying a second strike time determination in the audio recording, and
associating the physical location, which has been identified based on the sensor observations, with the mobile computing device when the second strike time determination is matched with the first strike time determination.

15. The system of claim 14, wherein the mobile computing device is programed to perform operations comprising displaying a prompt to record the audio recording; and wherein generating the audio recording comprises recording audio during an interval of time.

16. The system of claim 14, wherein the data of the audio recording is the audio recording in its entirety.

17. The system of claim 14, wherein the mobile computing device is programed to perform operations comprising identifying a first strike time determination in the audio recording; and wherein sending the audio recording data comprises sending the first strike time determination to the one or more computers.

18. The system of claim 14, wherein the audio recording is a first audio recording, the physical location is a first physical location, the object is a first object, and the one or more computers of the tracking system are programed to perform operations comprising:
identifying a second physical location for a second object with a strike time determination that matches the second strike time determination;
in response to identifying the second physical location, initiating one or more second audio recordings by the microphone of the mobile computing device until identifying a single strike time determination for an object that matches a strike time determination identified in a second audio recording of the one or more second audio recordings;
identifying a third physical location in the striking area and a third strike time determination for the single object struck from the striking area based on sensor observations of the single object in flight between the striking area and the target area; and
associating an average physical location computed from the first physical location and the third physical location with the mobile computing device, when the second strike time determination is matched with the first strike time determination, and the third strike time determination is matched with the strike time determination identified from the second audio recording.

19. The system of claim 14, wherein the striking area is a tee area for a golf range.

20. The system of claim 14, wherein the object is a golf ball, and the information regarding one or more object strikes comprises golf shot statistics, a golf shot animation in a virtual golf game, or a combination thereof.

* * * * *